June 5, 1962 — A. C. WINTEMBERG — 3,037,466

RAILWAY VEHICLE STRUCTURE

Original Filed May 4, 1956 — 2 Sheets-Sheet 1

INVENTOR:
ADELBERT C. WINTEMBERG
By Francis A. Burgess
ATTORNEY.

June 5, 1962  A. C. WINTEMBERG  3,037,466
RAILWAY VEHICLE STRUCTURE

Original Filed May 4, 1956  2 Sheets-Sheet 2

INVENTOR:
ADELBERT C. WINTEMBERG
BY Francis T. Burgess
ATTORNEY.

United States Patent Office 3,037,466
Patented June 5, 1962

3,037,466
RAILWAY VEHICLE STRUCTURE
Adelbert C. Wintemberg, Drexel Hill, Pa., assignor to General Steel Industries, Inc., a corporation of Delaware
Original application May 4, 1956, Ser. No. 582,789, now Patent No. 2,925,789, dated Feb. 23, 1960. Divided and this application Dec. 31, 1959, Ser. No. 863,238
5 Claims. (Cl. 105—171)

The invention relates to railway rolling stock and in particular to means associated with a railway vehicle underframe for accommodating lateral motion between the underframe and the trucks. This application is a division of my co-pending application, Serial No. 582,789, filed May 4, 1956, now Patent No. 2,925,879 dated February 23, 1960.

In diesel-electric locomotives, space limitations on the locomotive underframe frequently require the use of relatively short wheel-base trucks, while at the same time other factors including track conditions and power requirements make desirable the use of six-wheel trucks provided with a separate motor for each wheel and axle assembly. Because of the large amount of equipment carried by the superstructure it is generally desirable that the height of the underframe from the rail be kept as low as possible. It is also of utmost importance that the weight of the locomotive be distributed uniformly to each of the wheels. These problems have all been solved in rigid-frame six-wheel trucks in which the body is supported on the truck frame at three points including a pivot center plate and two laterally spaced sliding bearings spaced longitudinally of the truck from the center plate. In such trucks, to provide adequate clearance above the intermediate axle for the motor associated therewith, the truck center plate is displaced from the usual position above the intermediate axle toward one end of the truck, and to distribute part of the body load to the other end of the truck and to provide adequate lateral stability, a pair of laterally spaced loading pads are located on the truck frame between the middle and the opposite end wheel and axle assembly. To provide adequate space longitudinally of the truck for the motors, and at the same time minimize the wheel-base, as well as to simplify the load distribution problem, the center plate and loading pads are made rigid with the truck frame. For ensuring constantly uniform weight distribution, a non-yielding body center plate and a pair of laterally spaced, non-yielding load supports are provided on the locomotive underframe for pivotal and sliding engagement, respectively, with the truck center plate and loading pads.

Trucks of this type are very satisfactory at speeds up to and including 60 miles per hour, and at higher speeds, they are not generally satisfactory due to the absence of provision for lateral motion of the body relative to the truck. In conventional trucks used in high speed service lateral motion bolsters carrying the truck center plate and side bearings are suspended from the truck frame by means of swing hangers, frequently with a spring plant and bolster springs interposed, but in some cases directly. In any event, the provision of a swing motion truck bolster requires considerable longitudinal space in the truck frame to accommodate the swing hangers and additional transom structure. This requires a longer wheel-base, which, as indicated above, is sometimes not feasible.

It is a principal object of the invention to provide, in a locomotive and truck arrangement, means for accommodating relative lateral motion between the locomotive body and trucks while at the same time retaining the short wheel-base and uniform weight distribution features of the truck referred to above.

A more detailed object is to achieve the principal object by providing a swing motion bolster associated with the locomotive underframe rather than with the truck.

An additional object is to provide a truck and body arrangement of the type described above wherein lateral movements of the body are accommodated partly by a body-associated swing motion bolster engaging the truck center-plate, and partly by sliding of the body on the loading pads, and at the same time to provide means for causing each of the three body and truck load supports to remain constantly in full engagement regardless of lateral displacement of the body. In this connection, it is evident that in the absence of such means, the tilting of the bolster which occurs when the usual swing motion bolster moves laterally would result in an angular opening between the opposing horizontal faces of the center plate, because of the parallelism maintained between the underframe and truck frame by the loading pads and associated body supports.

These objects are attained by supporting the underframe by swing hangers from a bolster supported on the truck center plate. To prevent partial separation between cooperating truck and underframe portions of any of the load supports, in one form of my invention I utilize normally inclined swing hangers, non-yielding load supports and a spherical center plate to accommodate tilting of the bolster without separation between the bolster and truck center plates. In this construction, even through the bolster tilts relative to the truck frame and the supported underframe, due to the inclination of the swing hangers, the center plate halves will remain in full load-transmitting engagement, because of their mating spherical surfaces.

In a second embodiment I similarly provide inclined swing hangers, but utilize the usual cylindrical center plate and yieldable load supports with spherical bearings, non-parallelism between the truck and underframe resulting from titlting of the bolster being accommodated in the springs and spherical bearings of the load supports.

In a third form of the invention I provide inclined swing hangers and non-yielding load-supports, but include a relatively thick rubber pad between the bolster and truck portions of the cylindrical center plate to accommodate, through yielding in compression, tilting of the bolster during its lateral movements.

The foregoing and other more detailed objects as will appear below are attained by the structures illustrated in the accompanying drawings in which.

Figure 1:
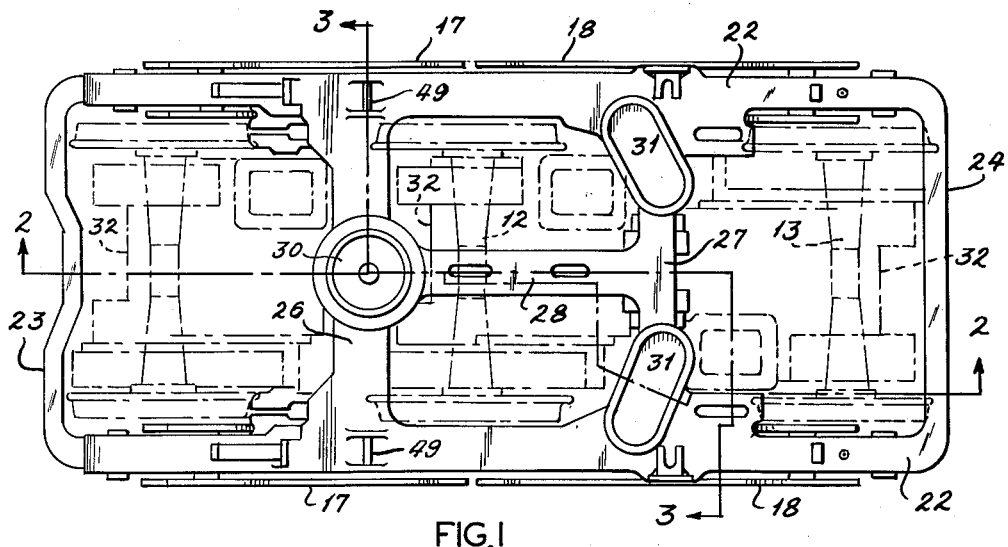
FIGURE 1 is a top view of a six wheel truck with three load-supporting elements.
Figure 2:
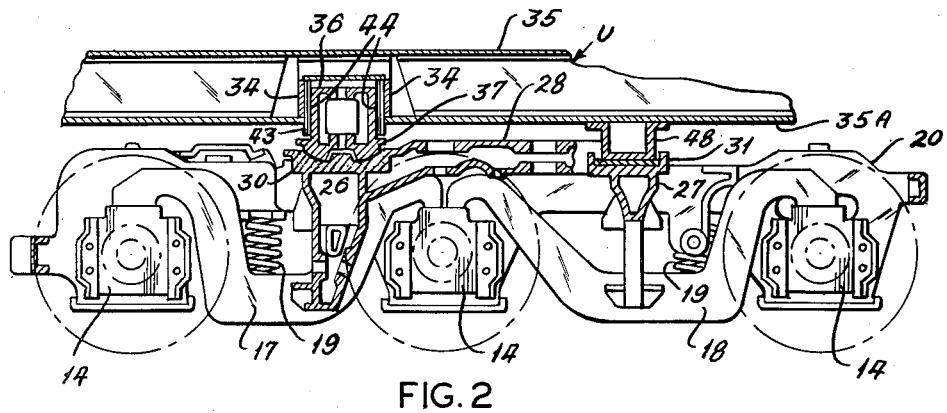
FIGURE 2 is a longitudinal vertical section taken approximately along the line 2—2 of FIGURE 1, and also showing a portion of the vehicle underframe.
Figure 4:
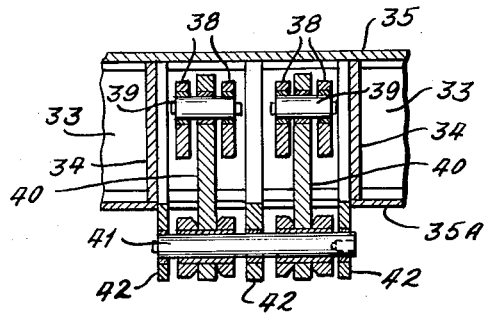
FIGURE 4 is a longitudinal vertical section taken on the line 4—4 of FIGURE 3.
Figure 3:
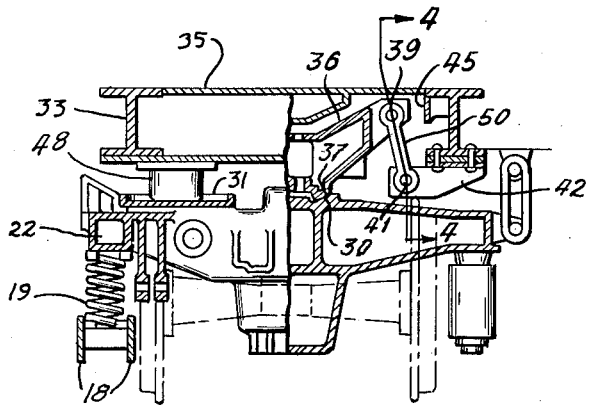
FIGURE 3 is a transverse vertical section taken approximately on the line 3—3 of FIGURE 1.

The truck includes three wheel and axle assemblies, 11, 12 and 13, each having a pair of journal boxes 14. Pairs of equalizer bars 17 and 18 extend between each journal box of the middle assembly 12 and the journal boxes of the end assemblies 11 and 13. Coil springs 19 seated on equalizer bars 17 and 18 resiliently support truck frame 20. Truck frame 20 includes wheel pieces 22, end transoms 23 and 24, intermediate transoms 26 and 27, and a central longitudinal member 28.

Three support elements including concave center plate 30 on transom 26, and laterally spaced and elongated loading pads 31 on transom 27, are provided for the vehicle underframe U. Center plate 30 is located on the longitudinal centerline of the truck at the intersection of transom 26 and longitudinal member 28, and the loading pads 31 are located, respectively, at the opposite end portions of transom 27. The loading pads are elongated in a direction generally transversely of the truck, with their major axes tangent to an arc having the center plate as its center. All three load supports form rigid parts of the truck frame. Motor and gear box assemblies 32 are associated with and supported in part by each axle and in part by brackets on adjacent intermediate transoms.

Locomotive underframe U includes a pair of laterally spaced longitudinally extending I-section sills 33 connected at intervals by transversely extending members including spaced cross ties 34. Top and bottom cover plates 35 and 35a join sills 33, bottom cover plate 35a being eliminated between adjacent cross ties 34, to form a bolster receiving recess therebetween. To provide relative lateral motion between truck and underframe, a laterally movable bolster 36 is located in the space between cross ties 34. Bolster 36 is formed with a convex spherical center plate 37 which is in pivotal and load-supporting engagement with truck center plate 30.

Bolster 36 is provided at its ends with extended ears 38 from which at 39 are pivotally suspended swing hangers 40. Hangers 40 are inclined outwardly from their upper ends to provide desirable lateral resistance characteristics and are pivotally connected at their lower ends as at 41 to brackets 42 extending inwardly and downwardly from sills 33 and underframe U from the bolster 36 for lateral movement relative thereto. For restricting bolster 36 to movements transversely of the underframe in order to transmit longitudinal forces from the truck to the underframe, cooperating chafing plates 43 and 44 are provided on the adjacent walls of the bolster and cross ties, respectively. For restraining excessive lateral movements of the bolster relative to the underframe, stops 45 are secured to the underframe sills in alignment with end surfaces of hanger-supporting ears 38.

Part of the body load is transmitted to the truck through non-yielding cylindrical elements 48, which are secured to underframe U in vertical registry with load supports 31, and which are received on the latter for slidable movement relative thereto responsive to swiveling movements of the truck about the center plate.

To compensate for the tilting of the bolster, which occurs during lateral displacement because of the inclination of the hangers, the spherical center plate structure has been provided, the convex portion 37 on the bolster engaging the concave portion 30 on the truck frame, so that as the bolster tilts during lateral displacement, even though the truck frame is retained parallel to the underframe by means of the loading pads 31 and cooperating elements 48, the bolster portion of the center plate merely rotates about a horizontal axis within the truck portion and no separation occurs.

Figure 5:
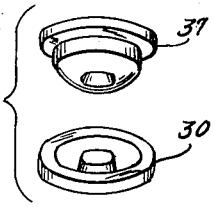
FIGURE 5 is a three-dimensional view of the spherical center plates shown in vertical section in FIGURES 2 and 3.
Figure 8:
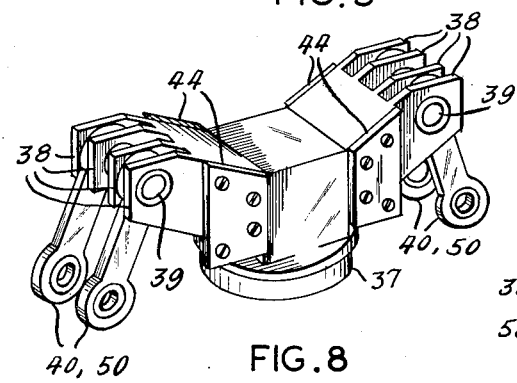
FIGURE 8 is a perspective view of the bolster and associated swing hangers.
Figure 6:
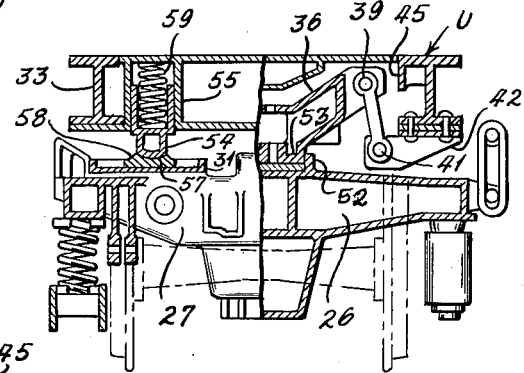
FIGURE 6 is a transverse vertical section taken approximately on the line 3—3 of FIGURE 1, but illustrating a second embodiment of the invention.

A second form of the invention is shown in FIGURE 6 in which the bolster construction is similar to FIGURE 5 except that a cylindrical flat-bottom center plate 52, 53 is provided. To compensate for the tilting of the bolster and prevent separation at any of the three load supports, the underframe elements engageable with load supports 31 consist of a plunger 54 arranged for vertical movement in a cylindrical housing 55 embodied in the underframe. The lower end surface 57 of plunger 54 is of spherical form and engages a mating spherical surface on bearing shoe 58 which in turn slidably rests on loading pad 31. Coil springs 59 in housings 55 constantly urge plungers 54 downwardly so that bearing shoes 58 are always in slidable engagement with loading pads 31, any angularity between the truck and underframe resulting from tilting of the bolster being accommodated by means of the spherical connections between plungers 54 and shoes 58.

Figure 7:
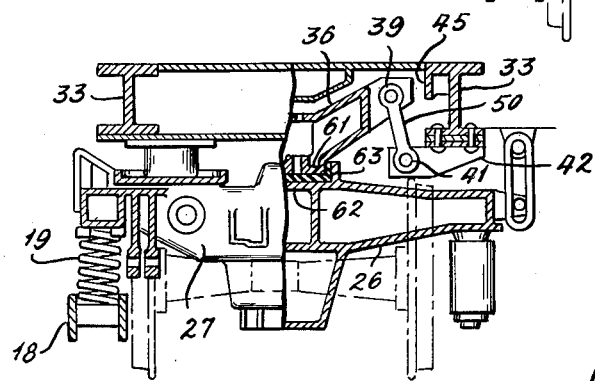
FIGURE 7 is a vertical transverse section taken approximately on the line 3—3 of FIGURE 1, but illustrating a third embodiment of the invention.

FIGURE 7 shows a third form of the invention in which non-yielding underframe support members 48 are provided. In this form tilting of the bolster is accommodated by the interposition of a relatively thick pad 63 of rubber or rubber-like material between the horizontal surfaces of cylindrical center plate halves 61 and 62, the pad being adapted to yield in compression responsive to angularity between the center plate halves.

When angularity occurs at the center plate, due to tilting of the bolster relative to the body (which is restrained against tilting by the non-yieldable underframe support members 46), rubber pads 63, though rendered substantially non-yieldable in compression by application of the body load, will flow from the shallow space between the center plate halves at one side to the relatively deep space at the other side, thus effectively transmitting the load through the entire horizontal area of the center plate when tilted as well as when the surfaces are parallel.

The details of the structures may be varied substantially without departing from the spirit of the invention and the exclusive use of those modifications coming within the scope of the appended claims is contemplated.

What is claimed is:

1. In a railway vehicle, a truck comprising wheel and axle assemblies and a frame supported thereon, a vehicle body, three bearing devices supporting said body on said frame and including a pair of upwardly-facing horizontal bearings rigid with said frame and opposite each other transversely of the truck and laterally-spaced from each other on opposite sides of the longitudinal axis of the truck, downwardly-facing bearing elements rigid with said vehicle body and in horizontally-slidable engagement with said bearings, an upwardly-facing center plate rigid with said frame on the longitudinal axis of said truck and spaced longitudinally of said truck from said bearings, a bolster having a downwardly-facing center plate in mating engagement with said upwardly-facing center plate, transversely swingable hangers depending from the end portions of said bolster and pivotally connected at their lower ends to said vehicle body, said hangers being normally inclined outwardly from said bolster, said mating center plates forming the sole support of said bolster on said frame and forming a limited universal pivot whereby said bolster is tiltable relative to said frame in a vertical plane transversely of the vehicle and said center plates are constantly in load-supporting relation throughout their normal area of vertical opposition irrespective of relative inclination of said body and said bolster resulting from lateral movements of said body relative to said bolster and the normal inclination of said swing hangers.

2. A railway vehicle according to claim 1 in which said vehicle body includes transversely-spaced longitudinally-extending and longitudinally-spaced transversely-extending underframe elements forming a downwardly open recess, and said bolster is received in said recess.

3. In a railway vehicle according to claim 2, said center plates comprising mating upright cylindrical members having opposing flat horizontal surfaces, there being a pad of rubber-like material interposed between said opposing flat surfaces whereby to accommodate relative lateral tilting of said bolster and said truck frame.

4. In a railway vehicle according to claim 2, said center plates comprising mating semi-spherical surfaces whereby to accommodate relative lateral tilting of said bolster and said truck frame and thus prevent separation of said downwardly-facing bearing elements and said upwardly-facing bearings when said body is caused to tilt laterally relative to said bolster during relative lateral movements therebetween.

5. A railway vehicle according to claim 2 in which said transversely extending underframe elements have vertical surfaces opposing and slidably engaging corresponding surfaces on said bolster for preventing movement of said bolster longitudinally of the vehicle body while accommodating movement transversely thereof.

References Cited in the file of this patent

UNITED STATES PATENTS

| | | |
|---|---|---|
| 703,379 | Buhoup | July 1, 1902 |
| 1,402,842 | Dath | Jan. 10, 1922 |
| 1,781,253 | Spencer | Nov. 11, 1930 |
| 2,268,267 | Sheesley | Dec. 30, 1941 |
| 2,424,001 | Sheesley | July 15, 1947 |
| 2,703,057 | Wintemberg | Mar. 1, 1955 |
| 2,705,924 | Travilla et al. | Apr. 12, 1955 |
| 2,780,179 | Long | Feb. 5, 1957 |
| 2,797,650 | Ross | July 2, 1957 |

FOREIGN PATENTS

| | | |
|---|---|---|
| 574,817 | Great Britain | Jan. 22, 1946 |